United States Patent
Kosako

[11] Patent Number: 5,335,028
[45] Date of Patent: Aug. 2, 1994

[54] WATERPROOF AND/OR WATER-RESISTANT CAMERA

[75] Inventor: Kosei Kosako, Tokyo, Japan

[73] Assignee: Asahi Kogaku Kogyo Kabushiki Kaisha, Tokyo, Japan

[21] Appl. No.: 3,847

[22] Filed: Jan. 11, 1993

Related U.S. Application Data

[63] Continuation of Ser. No. 762,449, Sep. 19, 1991, abandoned.

[30] Foreign Application Priority Data

Sep. 20, 1990 [JP] Japan .................. 2-098813
Jul. 11, 1991 [JP] Japan .................. 3-062091

[51] Int. Cl.⁵ .......................................... G03B 17/08
[52] U.S. Cl. ............................................. 354/64
[58] Field of Search ................................. 354/64

[56] References Cited

U.S. PATENT DOCUMENTS 4,926,085  5/1990  Sawayama et al. ........... 310/323
5,066,965  11/1991  Tanaka et al. .................. 354/64
5,070,348  12/1991  Hayakawa et al.

FOREIGN PATENT DOCUMENTS 1088801  9/1960  Fed. Rep. of Germany.
2490352  3/1982  France.
2651899  3/1991  France.

OTHER PUBLICATIONS

Aluminum Handbook, Table 14.4.6, p. 133, Jan. 19, 1979.

Primary Examiner—David M. Gray
Attorney, Agent, or Firm—Sandler, Greenblum & Bernstein

[57] ABSTRACT

A camera is provided having a waterproof and/or water-resistant camera body provided with a stationary lens barrel, a photographing lens barrel which is provided in the stationary lens barrel and moves in the optical axis direction of the camera, and an annular seal member which is provided between the outer periphery of the photographing lens barrel and the inner periphery of the stationary lens barrel. The photographing lens barrel, or at least a surface layer thereof, that is in contact with the annular seal member, is composed of a rustproof material with a hardness of at least Hv150.

11 Claims, 3 Drawing Sheets

WATERPROOF AND/OR WATER-RESISTANT CAMERA

This application is a continuation of application Ser. No. 07/762,449, filed Sep. 19, 1991, now abandoned.

BACKGROUND OF THE INVENTION

1. Field of the Invention

The present invention relates to a waterproof and/or water-resistant camera, and more precisely, it relates to a waterproof and/or water-resistant camera having a photographing lens barrel which is movable relative to a camera body.

2. Description of the Related Art

Recently, water-resistant cameras which do not permit rain, spoondrift (spray) or the water from a stream to permeate therethrough, and waterproof cameras which can take a picture even in shallow water have been available on the market. In known cameras, of this type the connection between the movable photographing lens barrel and immovable camera body does not provide adequate watertightness. In a zoom lens camera, a photographing lens barrel is mounted to the camera body so as to retractably and relatively move through an opening formed in the front wall of the camera body. To this end, it is known to provide an annular seal member in the space between the outer periphery of the photographing lens barrel and the inner peripheral edge of the opening in the front wall of the camera body.

As a camera of this type is often used at the beach, in the rain or even in shallow water, there is a high possibility that sand from the beach or muddy water will become lodged in the space between the photographing lens barrel and the camera body. When the photographing lens barrel moves in the rearward direction with a grain of sand lodged between the annular seal member and the surface of the photographing lens barrel, a scratch would be made on the surface of the photographing lens barrel causing a decrease of watertightness of the camera unless the surface of the photographing lens barrel is hard enough to avoid being scratched.

SUMMARY OF THE INVENTION

The primary object of the present invention is to provide a waterproof and/or water-resistant camera which retains watertightness even if a grain of sand, lodged between the surface of the photographing lens barrel and the annular seal member, comes into forceable contact with the surface of the photographing lens barrel.

To achieve the object mentioned above, according to the present invention, there is provided a waterproof and/or water resistant camera comprising a camera body, provided with a stationary lens barrel, a photographing lens barrel which is provided in the stationary lens barrel and movable in the optical axis direction of the camera, and an annular seal member which is provided between the outer periphery of the photographing lens barrel and the inner periphery of the stationary lens barrel. The photographing lens barrel, or at least its surface layer which is in contact with the annular seal member, is composed of a rustproof material with a hardness of Hv150 or more.

With this arrangement, the surface layer of the photographing lens barrel has a hardness of Hv150 or more, although it is preferable for the surface of the photographing lens barrel to have a hardness of Hv200 or more, and is therefore scratch-resistant even when zooming is carried out with a grain of sand lodged between the annular seal member and the surface of the photographing lens barrel. Therefore, the camera can retain its watertightness.

Further, the photographing lens barrel, or at least its surface layer, is composed of materials such as aluminum or an aluminum alloy, brass, copper, iron or an iron alloy, a copper alloy, synthetic resin, or stainless steel. As for a photographing lens barrel composed of aluminum or an aluminum alloy, the alumite method is adopted to make the surface of the photographing lens barrel harder. In the case of the photographing lens barrel composed of iron, brass, copper, an iron alloy, a copper alloy or synthetic resin, the surface of the photographing lens barrel is chrome plated. In regard to the movable photographing lens barrel composed of stainless steel, no treatment is applied as stainless steel alone is sufficiently hard.

The present disclosure relates to subject matter contained in Japanese Utility Model Application Nos. 2-98813 (filed on Sep. 20, 1990) and 3-62091 (filed on Jul. 11, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 2:
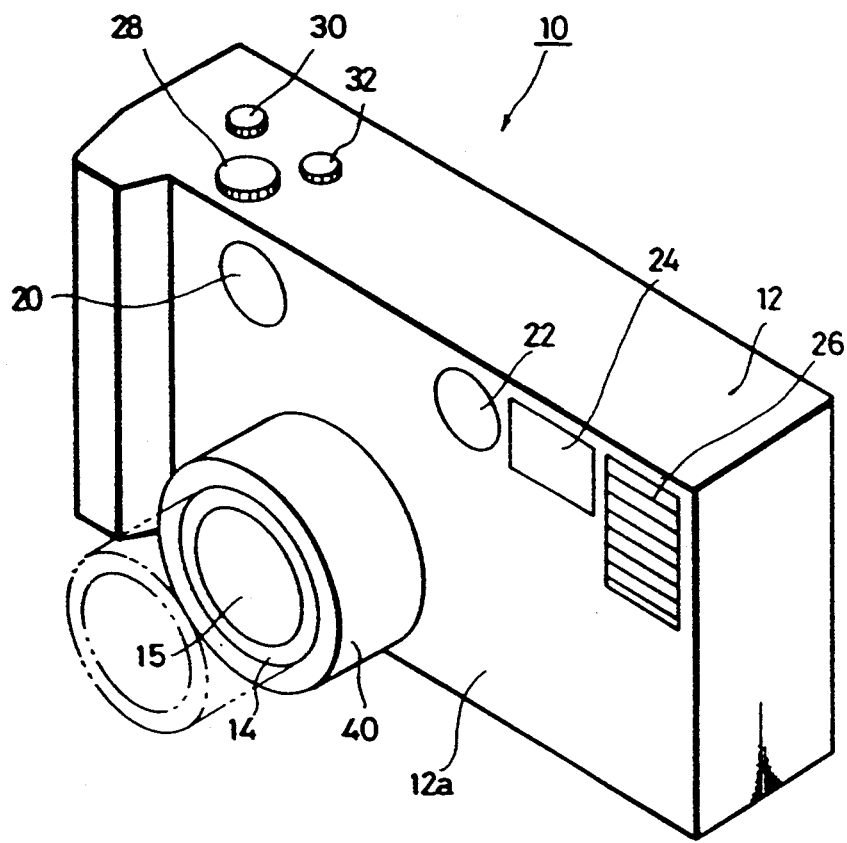
FIG. 2 is a perspective view of a waterproof and/or water-resistant camera having a photographing lens barrel which is movable relative to a camera body of the camera in accordance with the present invention.

FIG. 2 is a perspective view of a waterproof and/or water-resistant camera according to the present invention. A waterproof and/or water-resistant camera 10 has a watertight camera body 12 wherein a movable photographing lens barrel 14 is provided in a watertight fashion. The movement of the photographing lens barrel 14 with respect to a stationary lens barrel 40, secured to the front surface of the camera body 12a, is effected while maintaining a watertight seal (not shown) between the external and internal surfaces, respectively. The photographing lens barrel 14 moves in the optical axis direction of the photographing optical system in accordance with the operation of a pair of zooming switches 30 and 32, for instance, provided beside a release button 28. In front of the photographing lens barrel 14 is a hard glass plate 15 provided in a watertight fashion for the purpose of protecting of the photographing lenses (not shown). On the front wall of the camera body 12, a light emitter portion 20, a light receiving portion 22, an object-side window of view finder 24 and a strobe emitter portion 26 are provided. The light emitter portion 20 and the light receiving portion 22 are for measuring the distance of an object to be photographed.

Figure 3:
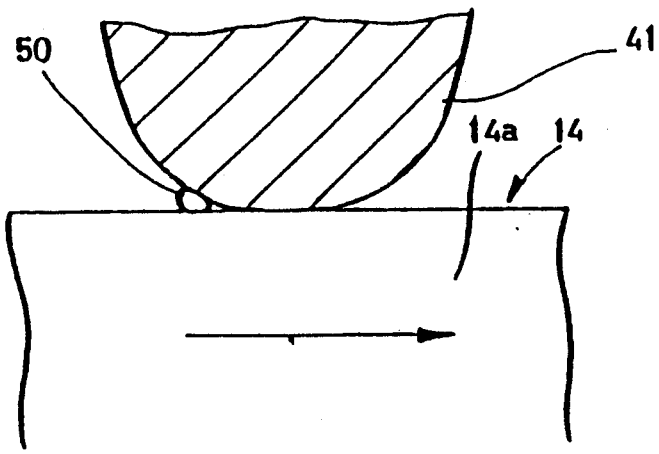
FIG. 3 is a sectional view of a circumferential portion of the annular seal member and the photographing lens barrel in contact therewith, illustrating the lodging of a particle therebetween.

To satisfy the requirement of watertightness, it is important for the surface of the photographing lens barrel, with which the annular seal member comes into forceable contact, to have a certain degree of hardness. In FIG. 3, a photographing lens barrel 14 which is movable in the optical axis direction and an annular seal member 41 which comes into forceable contact with the photographing lens barrel surface layer 14a are shown. Also in FIG. 3, a grain of sand 50 which is lodged between the annular seal member 41 and the photographing lens barrel surface layer 14a is shown. When the photographing lens barrel 14 moves in the direction of the arrow shown in FIG. 3, with a grain of sand 50 lodged between the annular seal member 41 and the photographing lens barrel surface layer 14a, the possibility of making a scratch on the photographing lens barrel surface layer 14a is greatly reduced in accordance with the present invention. The photographing lens barrel surface layer 14a is hard enough to avoid being scratched.

Figure 1:
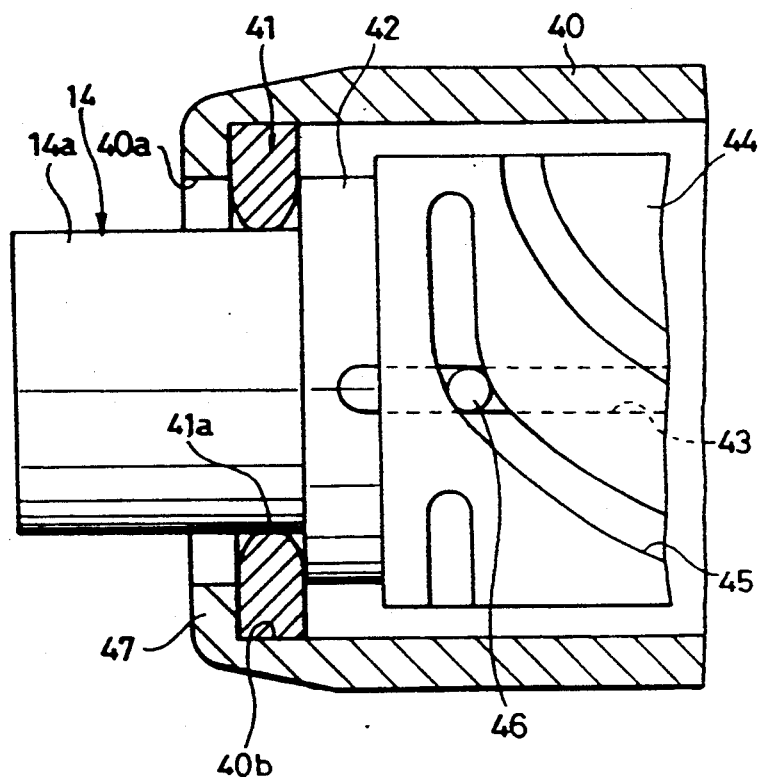
FIG. 1 is a longitudinal sectional view of a photographing lens barrel block in accordance with the present invention.

As seen in FIG. 1, an immovable cylinder 42 which is fixed to the camera body 12 (not shown) is provided in the stationary lens barrel 40. The immovable cylinder 42 has a leading cam groove 43 extending in the optical axis direction of the photographing optical system. The immovable cylinder 42 is positioned in a rotatable cam ring 44 which is movable about the optical axis of the photographing optical system. The cam ring 44 is provided with a zooming cam groove 45. The photographing lens barrel 14, which is positioned inside the immovable cylinder 42 and is slidable in the optical axis direction of the photographing optical system, has a roller 46 which protrudes through both the leading cam groove 43 and the zooming cam groove 45. Accordingly, the photographing lens barrel 14 is moved in the optical axis direction of the photographing optical system by rotation of the cam ring 44 moved by a zooming motor (not shown) via the roller 46.

Figure 4:
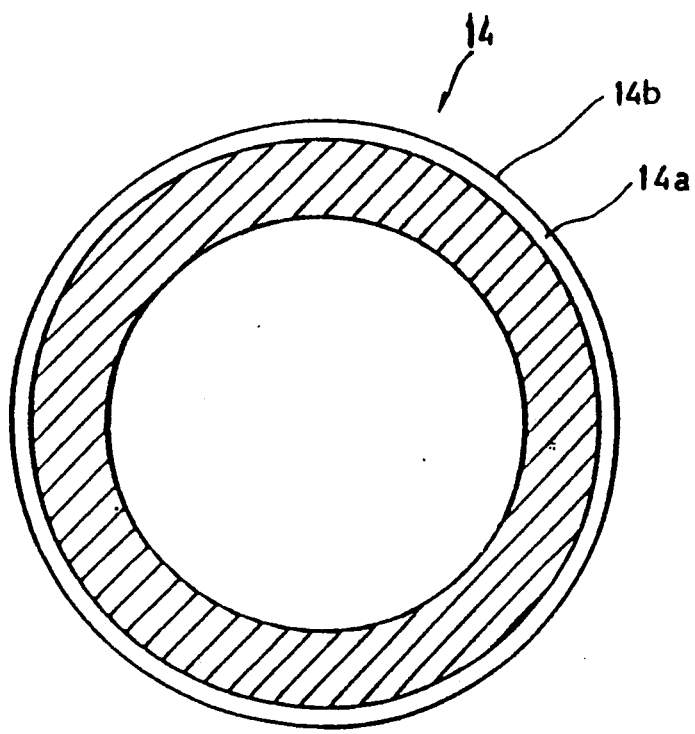
FIG. 4 is a cross-sectional view of a photographing lens barrel in accordance with the present invention.

At the front end of the stationary lens barrel 40 is a flange 47 establishing an opening 40a in which the photographing lens barrel 14 moves. The annular seal member 41 is compressed between the contacting inner wall (fastening portion) 40b, connected thereto, of the stationary lens barrel 40 and the photographing lens barrel 14 to bring the inner peripheral edge of the annular seal member 41a into forceable contact with the photographing lens barrel surface layer 14a in a watertight fashion. As seen in FIG. 4, the cross-sectional view of the photographing lens barrel 14, in this embodiment of the present invention, the photographing lens barrel 14 is made of an aluminum alloy. As the alumite method is applied to the photographing lens barrel surface layer 14a, the alumite membrane 14b is formed thereon. The photographing lens barrel surface layer 14a with the alumite method being applied thereto has a hardness of Hv240 to Hv250 (actual measuring result), resulting in an increased hardness on the photographing lens barrel surface layer 14a. The hardness of the surface of typical photographing lens barrel made of the alloy composed mainly of aluminum and magnesium, standardized by JIS (JAPANESE INDUSTRIAL STANDARD) A5052, is from Hv60 to Hv80.

The term "Hv", mentioned above, is a unit of hardness known as Vickers hardness or diamond pyramid hardness. Vickers hardness is determined as follows:

(1) A pyramid-shaped diamond having a peak angle of 136 degrees is forced against the surface of a sample material under some specified load, thereby making a square indentation corresponding to the pyramid-shaped diamond.

(2) The length of the diagonal line of the indentation square is measured.

(3) The data obtained above is then used in the following equation:

$$Hv = 1.85441 * P/d * d$$

where,
P = load (kgf) and,
d = length of the diagonal line (mm)

With the arrangement above, when the waterproof and/or water-resistant camera 10 is used in places such as the beach, a place where it is raining, or even in shallow water, the photographing lens barrel surface layer 14a will not be scratched by grains of sand lodged between the photographing lens barrel surface layer 14a and the annular seal member 41 while zooming, due to the appreciation of the alumite method to the photographing lens barrel surface layer 14b. As a result, the watertightness of the waterproof and/or water-resistant camera 10 is maintained.

Furthermore, when the photographing lens barrel 14, or at least the photographing lens barrel surface layer 14a, is made of neither aluminum nor an aluminum alloy, but rather materials such as iron, brass, copper, an iron alloy, a copper alloy, or synthetic resin, the hardness of the photographing lens barrel surface layer 14a is improved by chrome plating the surface. The chrome plated surface of the photographing lens barrel 14 has a hardness of more than Hv750. A kind of synthetic resin, for instance, poly-carbonate resin containing 10 weight percent glass itself has a hardness of Hv15 to Hv16, and an alloy of copper and zinc composed of 60% copper and 40% zinc itself a hardness of about Hv100.

Moreover, when the photographing lens barrel 14, or at least the photographing lens barrel surface layer 14a, is made of stainless steel, a type of stainless steel whose hardness is more than Hv150 must be selected. For example, in case of 18-8 stainless steel, the hardness itself is Hv155 without any treatment such as rolling. The hardness of 18-8 stainless steel is Hv230, Hv300, Hv370, Hv400, with such treatment as 20% rolling, 40% rolling, 60% rolling, 80% rolling, respectively.

As can be seen from the foregoing, according to the present invention, the surface of the photographing lens barrel resists scratching by a grain of sand, for example, lodged between the surface of the photographing lens barrel and the inner peripheral edge of the annular seal member while zooming, thus decreasing the amount of trouble with the watertight seal between the opening of the stationary lens barrel and the outer periphery of the photographing lens barrel, consequently, the photographer will have a greater confidence in the waterproof and/or water-resistant camera.

I claim:

1. A waterproof and/or water-resistant camera comprising:
    a camera body;
    a stationary lens barrel which is provided with said camera body;
    a photographing lens barrel which is provided in said stationary lens barrel and is movable in an optical axis direction of said camera; and
    annular seal means for sealing provided between an outer periphery of said photographing lens barrel and an inner periphery of said stationary lens barrel, at least a surface layer of said photographing lens barrel that is in contact with said annular seal means being composed of a rustproof material with a hardness of at least Hv 150, said photographing lens barrel being composed of metal with said surface layer being chrome plated.

2. The camera according to claim 1, wherein said metal is selected from the group consisting of iron, brass, copper, iron alloy and copper alloy.

3. The camera according to claim 1, wherein said chrome plated surface of said photographing lens barrel has a hardness of more than Hv 750.

4. The camera according to claim 1, wherein said stationary lens barrel comprises a flange defining an opening through which said photographing lens barrel is movable.

5. A waterproof and/or water-resistant camera comprising:
a camera body;
a stationary lens barrel which is provided with said camera body;
a photographing lens barrel which is provided in said stationary lens barrel and is movable in an optical axis direction of said camera; and
annular seal means for sealing provided between an outer periphery of said photographing lens barrel and an inner periphery of said stationary lens barrel,
at least a surface layer of said photographing lens barrel that is in contact with said annular seal means being composed of a rustproof material with a hardness of at least Hv 150, said surface layer being composed of at least aluminum with an alumite method being applied to said surface layer.

6. A camera comprising:
a camera body including an opening provided with annular seal means for sealing; and
a photographing lens barrel movable in an optical axis direction of said camera through said opening,
at least a surface layer of said photographing lens barrel that is in contact with said annular means having a higher hardness than the inner portion of said photographing lens barrel, said surface layer having a hardness of at least Hv 150 and said photographing lens barrel being composed of synthetic resin with said surface layer being chrome plated.

7. The camera according to claim 6, further comprising a stationary lens panel fixed to said camera body, said stationary lens barrel comprising an inner wall portion and a flange defining said opening, said annular seal means being compressed between said inner wall portion and said surface layer of said photographing lens.

8. The camera according to claim 6, wherein said synthetic resin is a poly-carbonate resin containing about ten percent glass by weight.

9. The camera according to claim 6, wherein said chrome plated surface of said photographing lens barrel has a hardness of more than Hv 750.

10. A camera comprising:
a camera body including an opening provided with annular seal means for sealing; and
a photographing lens barrel movable in an optical axis direction of said camera through said opening,
at least a surface layer of said photographing lens barrel that is in contact with said annular means having a higher hardness than the inner portion of said photographing lens barrel, said surface layer being composed of at lest aluminum with an alumite method being applied to said surface layer.

11. A waterproof and/or water-resistant camera, comprising:
a camera body;
a stationary lens barrel secured to a front surface of said camera body, said stationary lens barrel having a flange on one end and defining an opening;
a photographing lens barrel supported in said opening of said stationary lens barrel and being movable in an optical axis direction of said camera through said opening; and
an annular seal member for sealing a periphery of said opening and an outer periphery of said photographing lens, said seal member being compressed between an inner wall fastening portion of said stationary lens barrel that is adjacent to said flange and an outer surface layer of said photographing lens barrel,
said outer surface layer of said photographing lens barrel having a hardness of at least Hv 150 and being chrome plated so as to be scratch resistant and so as to maintain the watertightness of the camera.

* * * * *

UNITED STATES PATENT AND TRADEMARK OFFICE
CERTIFICATE OF CORRECTION

PATENT NO. : 5,335,028
DATED : August 2, 1994
INVENTOR(S) : Kosei KOSAKO

It is certified that error appears in the above-indentified patent and that said Letters Patent is hereby corrected as shown below:

At column 6, line 23 (claim 10, line 10), change "lest" to ---least---.

Signed and Sealed this

Twenty-first Day of March, 1995

Attest:

BRUCE LEHMAN

Attesting Officer     Commissioner of Patents and Trademarks